United States Patent
Meguriya et al.

(10) Patent No.: US 6,274,648 B1
(45) Date of Patent: *Aug. 14, 2001

(54) HOLLOW FILLER-CONTAINING SILICONE RUBBER COMPOSITION

(75) Inventors: Noriyuki Meguriya; Shinichi Ide, both of Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/414,528

(22) Filed: Oct. 8, 1999

(30) Foreign Application Priority Data

Oct. 15, 1998 (JP) .................................. 10-293220
Oct. 16, 1998 (JP) .................................. 10-294352

(51) Int. Cl.$^7$ ........................................ C08J 9/32
(52) U.S. Cl. ................................. 523/218; 524/588
(58) Field of Search ....................... 523/218; 524/588

(56) References Cited

U.S. PATENT DOCUMENTS

| | | | |
|---|---|---|---|
| 4,451,584 | * | 5/1984 | Schaefer ........................... 521/54 |
| 5,246,973 | * | 9/1993 | Nakamura et al. ................. 521/54 |
| 5,536,568 | * | 7/1996 | Teruo ................................. 428/327 |
| 5,607,993 | * | 3/1997 | Christy .............................. 524/237 |
| 5,614,563 | * | 3/1997 | Ishida et al. ....................... 521/54 |
| 5,981,610 | * | 11/1999 | Meguriya et al. .................. 521/54 |
| 5,998,548 | * | 12/1999 | Brennenstuhl et al. ............ 525/331.9 |
| 6,008,271 | * | 12/1999 | Hosoda et al. .................... 523/218 |

FOREIGN PATENT DOCUMENTS

4071108 * 3/1992 (JP) .

OTHER PUBLICATIONS

Abstract, JP 4–71108, Mar. 1992.*

* cited by examiner

*Primary Examiner*—Margaret G. Moore
(74) *Attorney, Agent, or Firm*—Birch, Stewart, Kolasch & Birch, LLP

(57) ABSTRACT

A hollow filler-containing silicone rubber composition comprising 100 parts by weight of a curable organopolysiloxane composition and 0.1–20 parts by weight of a hollow filler in the form of microballoons having a mean particle size of 10–200 μm and an elasticity of at least 10% is injection molded into a cured silicone rubber part having improved shock-absorbing properties and compression properties as well as weather resistance, freeze resistance and heat resistance inherent to silicone rubber.

11 Claims, No Drawings

HOLLOW FILLER-CONTAINING SILICONE RUBBER COMPOSITION

This invention relates to a hollow filler-containing silicone rubber composition suitable for use as rubber material in applications where weight reduction is of importance, such as transporting vehicles, business machines, and electric appliances.

BACKGROUND OF THE INVENTION

In general, rubber materials are more shock absorbing than metals and plastics. Of the rubber materials, silicone rubber is expected to find use in a wider variety of fields because its heat resistance, weather resistance and electrical insulating properties are excellent. However, the rubber material mainly absorbs impact energy by way of distortion due to its viscoelasticity and thus requires a thickness in the impact applied direction, which represents a certain weight. Under the current trend of promoting weight reduction in such applications as transporting vehicles, business machines, and electric appliances, there is a desire to have a material which is lightweight and sufficiently elastic and permits a number of molded parts to be manufactured.

One known material is silicone rubber foam. The silicone rubber foam is typically prepared by adding pyrolytic blowing agents. Alternatively, a silicone rubber composition is molded and cured in such a manner that hydrogen gas may evolve upon curing as a by-product whereby a foam is obtained. However, the addition of pyrolytic blowing agents has the problem that decomposition gases are toxic and odorous. Where a platinum catalyst is used as the curing catalyst, undesirably the blowing agent acts to retard curing. The method of utilizing hydrogen gas evolving upon curing suffers from the problems that hydrogen gas is explosive and the uncured composition requires careful handling during storage.

Silicone rubber foam can also be formed by injection molding a silicone rubber composition in a mold whereby the rubber is expanded in the mold. This method is difficult to produce a silicone rubber foam having uniform microcells.

SUMMARY OF THE INVENTION

An object of the invention is to provide a hollow filler-containing silicone rubber composition which cures into a silicone rubber having improved shock-absorbing properties and compression properties as well as weather resistance, freeze resistance and heat resistance inherent to silicone rubber.

Another object of the invention is to provide a hollow filler-containing silicone rubber composition which is lightweight, experiences minimal rupture of a hollow filler during molding, and cures into a silicone rubber having improved impact resistance.

In a first aspect, the invention provides a hollow filler-containing silicone rubber composition comprising, in admixture, 100 parts by weight of a curable organopolysiloxane composition and 0.1 to 20 parts by weight of a hollow filler, typically in the form of microballoons, having a mean particle size of up to 200 μm and an elasticity of at least 10%. This silicone rubber composition cures into a silicone rubber part having improved shock-absorbing properties and compression properties as well as the properties inherent to silicone rubber.

According to the invention, filler microballoons containing gas in the interior, having a specific particle size and an elasticity of at least 10% as measured by a method to be described later, and especially formed of a thermoplastic resin are blended in a curable organopolysiloxane composition. The resulting silicone rubber composition has many advantages that it quickly cures, that when impacted by a small force, it absorbs the impact by way of deformation of microballoons, that when impacted by a large force enough to break microballoons, it absorbs the impact by way of the internal gas, and that it fulfils the desired weight reduction while it does not compromise the weather resistance, freeze resistance and heat resistance inherent to silicone rubber.

In a second aspect, the invention provides a hollow filler-containing silicone rubber composition comprising (1) 100 parts by weight of an organopolysiloxane having on the average at least two alkenyl radicals in a molecule and an average degree of polymerization of up to 1,200, (2) 0.1 to 50 parts by weight of an organohydrogenpolysiloxane of the following average compositional formula (2):

$$R_b H_c SiO_{(4-b-c)/2} \tag{2}$$

wherein R is a substituted or unsubstituted monovalent hydrocarbon radical of 1 to 10 carbon atoms, b is a positive number of 0.7 to 2.1, c is a positive number of 0.001 to 1.0, and the sum of b+c is from 0.8 to 3.0, said organohydrogenpolysiloxane having at least two hydrogen atoms each attached to a silicon atom in a molecule, (3) a catalytic amount of an addition reaction catalyst, and (4) 0.5 to 10 parts by weight of a hollow filler in the form of microballoons having a mean particle size of 20 to 60 μm.

This hollow filler-containing silicone rubber composition is fully lightweight and elastic, and can be effectively molded, without substantial rupture of the hollow filler, and cured into a silicone rubber part having improved impact resistance. That is, the composition is a material capable of meeting the demand of weight reduction in such applications as transporting vehicles, business machines, and electric appliances.

DESCRIPTION OF THE PREFERRED EMBODIMENT

In the first and second embodiments of the invention, the hollow filler to be blended in the silicone rubber composition acts such that gas-filled cells are created in a cured part to enable impact absorption like sponge rubber. Exemplary hollow fillers include glass balloons, silica balloons, carbon balloons, alumina balloons, zirconia balloons, shirasu (or silicious) balloons, and plastic balloons such as phenolic resin balloons and vinylidene chloride resin balloons.

Preferably, the hollow filler is formed of such a material that the hollow filler itself may have elasticity. Therefore, the preferred hollow filler is in the form of microballoons of a thermoplastic resin, especially microballoons formed of a homopolymer of vinylidene chloride, acrylonitrile, methacrylonitrile, an acrylate, or a methacrylate, or a copolymer of two or more of these monomers. With the thermoplastic resin microballoon filler used, an effective impact absorbing capability is obtainable. This is because the microballoons themselves have elasticity so that even when a weak force is applied, they may deform and thus absorb the impact.

The hollow filler in the form of microballoons has a mean particle size of up to 200 μm, typically 10 to 200 μm, preferably 10 to 100 μm, and more preferably 20 to 60 μm. The first embodiment of the invention favors the use of relatively large microballoons having a mean particle size in excess of 60 μm as well. Microballoons having a mean particle size in excess of 200 μm can be crushed during molding, failing to retain a sufficient impact absorbing capability. Microballoons having a mean particle size of less than 10 μm would be too small to achieve a sufficient impact absorbing capability. In the second embodiment wherein a composition can be molded, as by injection molding without substantial rupture of the hollow filler, into a cured part having improved impact resistance, it is preferred to use a microballoon filler having a mean particle size of 20 to 60 μm, more preferably 25 to 50 μm, and most preferably 30 to 40 μm. Microballoons having a mean particle size of less than 20 μm would be too small to achieve a sufficient impact absorbing capability. Microballoons having a mean particle size in excess of 60 μm can be crushed during injection molding and other molding processes involving application of a high pressure. The mean particle size can be determined as a weight average value (or median diameter) by means of a particle size distribution meter using laser light diffractometry and similar analysis means.

In the first embodiment, the hollow filler should have an elasticity of at least 10% and preferably at least 15%, as measured by the following method. A hollow filler with an elasticity of less than 10% is too rigid to provide a satisfactory impact absorbing capability. The upper limit of elasticity is generally about 50% and preferably about 45%.

Measurement of Elasticity

The elasticity is the range within which microballoons undergo deformation in a reversible or repetitive manner without rupture. The elasticity is measured by mixing a hollow filler with a silicone oil (dimethylpolysiloxane) having a viscosity of 1,000 centistokes at 25° C. in a volume ratio of 50:50, admitting 3.0 cc of the mixture into a 5.0-cc syringe having a cross-sectional area of 1 cm$^2$, closing the tip of the syringe, and forcing the plunger with a force of 20 kg-f (which corresponds to a pressure of 20 kgf/cm$^2$) whereupon a percent deformation is measured. For example, if the volume of the mixture is reduced from 3.0 cc to 2.4 cc, the percent deformation is calculated to be (1−2.4/3.0)×100= 20%. When the force of 20 kg-f is released, the mixture must recover the original volume of 3.0 cc.

In order that the composition exert the impact absorbing capability to a full extent, the hollow filler should preferably have a true specific gravity of 0.01 to 0.2, especially 0.015 to 0.1. A filler with a true specific gravity of less than 0.01 would be difficult to formulate and handle, have an insufficient strength to prevent crushing upon molding, and provide insufficient impact absorption. A true specific gravity of more than 0.2 means that the material portion (or wall) of the hollow filler accounts for a greater proportion of the filler, which would provide insufficient impact absorption or adversely affect the rubber properties of cured silicone rubber.

The hollow filler may be surface treated with calcium carbonate, talc or titanium oxide for the purpose of improving the strength, heat resistance and dispersibility, as long as the elasticity is not substantially compromised.

According to the first embodiment of the invention, 0.1 to 20 parts, preferably 0.2 to 15 parts, and more preferably 0.5 to 10 parts by weight of the hollow filler is blended with 100 parts by weight of the curable organopolysiloxane composition. Less than 0.1 part of the hollow filler provides an insufficient impact absorbing capability or is too small to achieve a weight reduction or improve moldability. Blending more than 20 parts of the hollow filler is difficult and results in a cured part with insufficient rubber strength.

Specifically, an appropriate amount of the hollow filler blended per 100 parts by weight of the curable organopolysiloxane composition (exclusive of the hollow filler) is 1 to 20 parts by weight if the filler has a true specific gravity of 0.1 to 0.2; 0.5 to 10 parts by weight if the filler has a true specific gravity of 0.05 to 0.1; and 0.1 to 5 parts by weight if the filler has a true specific gravity of 0.01 to 0.05. Differently stated, the hollow filler is preferably blended in an amount of 10 to 80% by volume, especially 15 to 75% by volume of the rubber material (that is, the overall hollow filler-containing organopolysiloxane composition). If the filler blend amount is so small as to give a volume ratio of less than 10% by volume, the composition would have an insufficient impact absorbing capability. If the filler blend amount is so large as to give a volume ratio of more than 80% by volume, its blending would become difficult and the cured part would have an insufficient rubber strength.

In the first embodiment of the invention, the curable organopolysiloxane composition may be any desired one of the peroxide curing type, condensation reaction curing type, and addition reaction curing type. Of these, an organopolysiloxane composition of the addition reaction curing type is preferred. The preferred organopolysiloxane composition is a composition comprising (1) 100 parts by weight of an organopolysiloxane having on the average at least two alkenyl radicals in a molecule and an average degree of polymerization of up to 1,200, (2) 0.1 to 50 parts by weight of an organohydrogenpolysiloxane of the following average compositional formula (2):

$$R_bH_cSiO_{(4-b-c)/2} \quad (2)$$

wherein R is a substituted or unsubstituted monovalent hydrocarbon radical of 1 to 10 carbon atoms, b is a positive number of 0.7 to 2.1, c is a positive number of 0.001 to 1.0, and the sum of b+c is from 0.8 to 3.0, the organohydrogenpolysiloxane having at least two hydrogen atoms each attached to a silicon atom in a molecule, and (3) a catalytic amount of an addition reaction catalyst.

Component (1) is an organopolysiloxane having on the average at least two alkenyl radicals in a molecule, represented by the average compositional formula (1).

$$R^1_aSiO_{(4-a)/2} \quad (1)$$

Herein, $R^1$ is a substituted or unsubstituted monovalent hydrocarbon radical having 1 to 10 carbon atoms, preferably 1 to 8 carbon atoms. The $R^1$ radicals may be the same or different. Letter a is a positive number of 1.5 to 2.8, preferably 1.8 to 2.5, and more preferably 1.95 to 2.05.

Examples of the substituted or unsubstituted monovalent hydrocarbon radical attached to a silicon atom represented by $R^1$ include alkyl radicals such as methyl, ethyl, propyl, isopropyl, butyl, isobutyl, tert-butyl, pentyl, neopentyl, hexyl, cyclohexyl, octyl, nonyl, and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; and substituted ones of the foregoing radicals in which some or all of the hydrogen atoms are replaced by halogen atoms (e.g., fluorine, bromine and chlorine) or cyano radicals, such as chloromethyl, chloropropyl, bromoethyl, trifluoropropyl, and cyanoethyl.

At least two of the organic radicals represented by $R^1$ are alkenyl radicals, preferably having 2 to 8 carbon atoms, more preferably 2 to 6 carbon atoms. Preferably the content of alkenyl radicals is 0.01 to 20 mol %, more preferably 0.1 to 10 mol % of the entire organic radicals attached to silicon atoms (that is, the substituted or unsubstituted monovalent hydrocarbon radicals represented by $R^1$ in formula (1)). It is noted that alkenyl radicals may be attached to silicon atoms at the ends of or midway a molecular chain or both. When the curing rate of a composition and the physical properties of cured parts are taken into account, the organopolysiloxane used herein should preferably contain at least an alkenyl radical attached to a silicon atom at the end of the molecular chain.

With respect to its molecular structure, the organopolysiloxane is a one having a backbone consisting of recurring diorganosiloxane units and blocked with a triorganosiloxy radical at each end of its molecular chain. The organopolysiloxane is preferably a diorganopolysiloxane of a straight chain structure while it may partially have a branched or cyclic structure. Also preferably, the organopolysiloxane has an average degree of polymerization (specifically, weight average degree of polymerization) of 50 to 1,200, more preferably 100 to 850 and is liquid at room temperature (25° C.). With an average degree of polymerization below 50, a cured part would have insufficient rubber properties. With an average degree of polymerization above 1,200, it would become difficult to blend microballoons, and the microballoons can be crushed during blending.

Component (2) is an organohydrogenpolysiloxane of the following average compositional formula (2).

$$R_bH_cSiO_{(4-b-c)/2} \quad (2)$$

The organohydrogenpolysiloxane should have at least two, preferably 2 to 200, more preferably 3 to 100 hydrogen atoms each attached to a silicon atom (that is, SiH radicals) in a molecule.

In formula (2), R is a substituted or unsubstituted monovalent hydrocarbon radical of 1 to 10 carbon atoms. The radicals represented by R include the same examples as mentioned for $R^1$ in formula (1). Letter b is a positive number of 0.7 to 2.1, c is a positive number of 0.001 to 1.0, and the sum of b+c is from 0.8 to 3.0. Preferably, b is from 1.0 to 2.0, c is from 0.01 to 1.0, and the sum of b+c is from 1.5 to 2.5.

The organohydrogenpolysiloxane should have at least two, preferably at least three SiH radicals in a molecule, which may be positioned at the ends of or midway a molecular chain or both. With respect to its molecular structure, the organohydrogenpolysiloxane may have a linear, cyclic, branched or three-dimensional network structure. The number of silicon atoms within one molecule (or degree of polymerization) is generally about 2 to 300, preferably about 4 to 150, while an organohydrogenpolysiloxane which is liquid at room temperature (25° C.) is desirable.

Exemplary organohydrogenpolysiloxanes include 1,1,3,3-tetramethyldisiloxane, methylhydrogencyclopolysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogenpolysiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, both end dimethylhydrogensiloxy-blocked methylhydrogensiloxane-dimethylsiloxane-diphenylsiloxane copolymers, copolymers of $(CH_3)_2HSiO_{1/2}$ units, $(CH_3)_3SiO_{1/2}$ units, and $SiO_{4/2}$ units, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)_3SiO_{3/2}$ units.

The organohydrogenpolysiloxane (2) is blended in an amount of 0.1 to 50 parts, preferably 0.3 to 20 parts by weight per 100 parts by weight of the organopolysiloxane (1). Differently stated, the organohydrogenpolysiloxane (2) is blended in such an amount that about 0.5 to 5 mol, preferably about 0.8 to 2.5 mol of silicon atom-attached hydrogen atoms (SiH radicals) in component (2) are available per mol of silicon atom-attached alkenyl radicals in component (1).

Component (3) is an addition reaction catalyst. Included are platinum catalysts, for example, platinum black, platinic chloride, chloroplatinic acid, reaction products of chloroplatinic acid with monohydric alcohols, complexes of chloroplatinic acid with olefins, and platinum bisacetoacetate, palladium catalysts, and rhodium catalysts. The addition reaction catalyst (3) is used in a catalytic amount, typically about 0.5 to 1,000 parts, preferably about 1 to 500 parts by weight of platinum group metal per million parts by weight of components (1) and (2) combined.

In the second embodiment, the hollow filler defined above is blended in an addition reaction curing type silicone rubber composition comprising the above-described components (1) to (3) as essential components. Preferably, a microballoon filler having a mean particle size of 20 to 60 μm, more preferably 25 to 50 μm, most preferably 30 to 40 μm is selected and blended in an amount of 0.5 to 10 parts, more preferably 1 to 8 parts by weight per 100 parts by weight of the organopolysiloxane (1). This selection enables weight reduction, minimizes crushing of microballoons during molding, and results in a cured part having improved impact resistance. From the standpoint of minimized crushing of microballoons during molding, the filler is only required to be a microballoon filler having a mean particle size of 20 to 60 μm, but need not have an elasticity of at least 10% as in the first embodiment.

In the first and second embodiments, a thixotropic agent is preferably blended in the composition. The thixotropic agent may be any of compounds capable of suppressing the flow of a material and imparting thixotropy thereto. In general, the thixotropic agents in solid state include fumed silica, fumed titanium oxide, and carbon. They may be used as such or after surface treatment with organosilicon compounds, for example, hexamethylsilazane, trimethylchlorosilane and polymethylsiloxane. As to liquid thixotropic agents (which are liquid at room temperature or 25° C.), any of thixotropic compounds which are incompatible with the inventive composition may be used. Typical examples are polyether compounds such as polyethylene oxide, polypropylene oxide, polyethylene glycol and polypropylene glycol, block polymers thereof with siloxane compounds, and copolymers of dimethylsiloxane and diphenylsiloxane.

The thixotropic agents may be used alone or in admixture of two or more. The thixotropic agent is blended in an amount of 0.01 to 30 parts, preferably 0.03 to 20 parts by weight per 100 parts by weight of the organopolysiloxane (1). Less than 0.01 part of the thixotropic agent would fail to impart thixotropy whereas more than 30 parts of the thixotropic agent would adversely affect moldability and rubber physical properties.

The silicone rubber composition of the second embodiment of the invention should preferably be thixotropic. As a measure of thixotropy, the silicone rubber composition should preferably show a sag of up to 1 inch, more preferably 0 to 0.8 inch, after 1 minute as measured by the Boeing flow jig test (defined below). With a sag of more than 1 inch, the composition tends to allow the hollow filler to float and separate with the lapse of time, resulting in a cured part having a locally varying specific gravity.

Boeing Flow Jig Test

This test is to determine the extent of restraining a test composition from sagging. A composition is placed in a bowl of a Boeing flow jig, and a horizontal test jig is placed upright with one end down so that the composition flows vertically downward from the bowl on the scale. The amount of the composition that flows downward under gravity is measured after 60 seconds as the distance (inch) of the flow. Although measurement is normally made after 35 seconds, measurement is herein made after 60 seconds in order to provide a definite difference among the relevant compositions.

In addition to the essential components mentioned above, another filler may be blended for the purpose of improving the mechanical strength, heat resistance or flame retardance of molded parts, as long as the benefits of the invention are not impaired. Such additional fillers including reinforcing fillers such as precipitated silica and fired silica and non-reinforcing fillers such as ground quartz, diatomaceous earth, asbestos, aluminosilicate, iron oxide, zinc oxide, calcium carbonate, magnesium carbonate, and cerium oxide. They may be used as such or after surface treatment with organosilicon compounds such as hexamethylsilazane, trimethylchlorosilane and polymethylsiloxane.

If desired, various additives such as flame retardants, fire resistance modifiers, sensitizers, colorants, heat resistance modifiers, and reducing agents, reaction controlling agents (e.g., ethynyl cyclohexanol), parting agents, and filler-dispersing agents may be added to the silicone rubber composition in addition to the essential components mentioned above. Exemplary filler-dispersing agents include alkoxysilanes, carbon functional silanes, and silanol radical-containing low molecular weight siloxanes and are preferably added in a minimal amount so as not to compromise the effect of the invention.

The silicone rubber composition of the invention may be prepared by uniformly mixing the above essential and optional components in a rubber milling machine such as a twin-roll mill, Banbury mixer, dough mixer or kneader, optionally followed by heat treatment. It is acceptable to premix part or all of the organopolysiloxane (1) with an inorganic filler such as silica and optionally a surface treating agent to form a base compound and thereafter, mix the base compound with the remainder of the organopolysiloxane (1), organohydrogenpolysiloxane (2), addition reaction catalyst (3), hollow filler, and other optional components.

The silicone rubber composition thus obtained can be molded into suitable silicone rubber parts by various molding processes such as injection molding, casting, compression molding and extrusion molding processes, preferably by injection molding. Curing conditions may be selected from a wide range. For example, appropriate curing conditions for compression molding in a mold include 120 to 220° C. and about 5 minutes to 1 hour. Appropriate curing conditions for injection molding include 80 to 220° C. and about 10 seconds to 10 minutes.

The hollow filler-containing silicone rubber composition of the first embodiment cures into a silicone rubber part having improved shock-absorbing properties and compression properties in that when impacted by a weak force, it can absorb the impact by way of deformation of balloons, and when impacted by such a strong force as to crush the balloons, it can absorb the impact by way of the internal gas, while it does not detract from the weather resistance, freeze resistance and heat resistance inherent to silicone rubber. The composition meets the demand for weight reduction. Therefore, the composition can be used in a wide variety of applications such as transportation vehicles, business machines, and electric appliances.

The hollow filler-containing silicone rubber composition of the second embodiment is lightweight, fully elastic, and easily moldable, experiences minimal rupture of the hollow filler during molding, and cures into a silicone rubber part capable of absorbing impact energy. Like the first embodiment, this composition meets the demand for weight reduction in a wide variety of applications such as transportation vehicles, business machines, and electric appliances.

EXAMPLE

Examples of the invention are given below by way of illustration and not by way of limitation. All parts are by weight.

Example 1

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0003 mol/g) and having a viscosity of 5,000 centistokes at 25° C. and an average degree of polymerization of about 450, 8 parts of hydrophobicized fumed silica having a specific surface area of 110 m²/g (R-972 by Nippon Aerosil K.K.), and 4 parts (corresponding to 48% by volume of the entire composition) of microballoons (a hollow filler) made of an acrylonitrile-methacrylonitrile-vinylidene chloride copolymer and having a true specific gravity of 0.04, a mean particle size of 40 μm and an elasticity of 38% as measured by the above-defined method (Expancel 551DE by Expancel). The mixer was operated for 30 minutes for admixing the ingredients. Further, 4.7 parts of methylhydrogenpolysiloxane of the following formula (3) and 0.05 part of ethynyl cyclohexanol as a reaction controlling agent were added to the mixer where agitation was continued for a further 15 minutes, obtaining a silicone rubber composition (1).

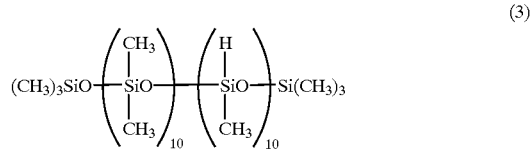

(3)

To 112 parts of this composition was added 0.1 part of a 1% isopropyl alcohol solution of chloroplatinic acid. After agitation and defoaming, the composition was cured for 30 minutes in an oven at 150° C. A specimen of 30 mm by 30 mm by 20 mm (thick) was cut from the cured composition. A weight of 20 kg was rested on the specimen and the thickness (t, mm) of the specimen was measured after one minute. A compression factor was calculated according to the following equation.

Compression factor (%)=(1−t/20)×100

Separately, the composition was cured for 30 minutes in an oven at 150° C. into a sheet of 2 mm thick, which was measured for rubber hardness (JIS A scale hardness) according to JIS K-6301. The results of compression factor and rubber hardness are shown in Table 1.

Example 2

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0003 mol/g) and having a viscosity of 5,000 centistokes at 25° C. and an average degree of polymerization of about 450, 5 parts of fumed silica having a specific surface area of 200 m$^2$/g (Aerosil 200 by Nippon Aerosil K.K.), and 1.5 parts (corresponding to 32% by volume of the entire composition) of microballoons (a hollow filler) made of an acrylonitrile-methacrylonitrile-vinylidene chloride copolymer and having a true specific gravity of 0.03, a mean particle size of 70 μm and an elasticity of 42% as measured by the above-defined method (Expancel 091DE-80 by Expancel). The mixer was operated for 30 minutes for admixing the ingredients. Further, 4.7 parts of methylhydrogenpolysiloxane of the formula (3) and 0.05 part of ethynyl cyclohexanol as a reaction controlling agent were added to the mixer where agitation was continued for a further 15 minutes, obtaining a silicone rubber composition (2).

To 107 parts of this composition was added 0.1 part of a 1% isopropyl alcohol solution of chloroplatinic acid. After agitation and defoaming, the composition was cured for 30 minutes at 150° C. As in Example 1, a compression factor and rubber hardness were determined. The results are shown in Table 1.

Example 3

A kneader/mixer was charged with 60 parts of a dimethylpolysiloxane blocked with a vinyldimethylsiloxy radical at each end of its molecular chain and having a viscosity of 5,000 centistokes at 25° C. and an average degree of polymerization of about 450, 30 parts of precipitated silica (Nipsil LP by Nippon Silica Industry K.K.), 2 parts of hexamethyldisilazane and 1 part of water. After agitation was continued for one hour at room temperature, the mixer was heated until the internal temperature reached 150° C., and agitation was continued for a further 3 hours. Cooling yielded a silicone rubber base (1).

A planetary mixer was charged with 80 parts of the silicone rubber base (1), 20 parts of a dimethylpolysiloxane containing vinyl radicals on side chains (vinyl value 0.0003 mol/g) and having a viscosity of 5,000 centistokes at 25° C. and an average degree of polymerization of about 450, 3 parts of hydrophobicized fumed silica having a specific surface area of 110 m$^2$/g (R-972 by Nippon Aerosil K.K.), and 2 parts (corresponding to 52% by volume of the entire composition) of microballoons (a hollow filler) made of an acrylonitrile-methacrylonitrile-vinylidene chloride copolymer and having a true specific gravity of 0.02, a mean particle size of 90 μm and an elasticity of 40% as measured by the above-defined method (Microsphere F-80ED by Matsumoto Oil, Fats & Pharmaceuticals K.K.). The mixer was operated for 30 minutes for admixing the ingredients. Further, 4.7 parts of methylhydrogenpolysiloxane of the formula (3) and 0.05 part of ethynyl cyclohexanol as a reaction controlling agent were added to the mixer where agitation was continued for a further 15 minutes, obtaining a silicone rubber composition (3).

To 106 parts of this composition was added 0.1 part of a 1% isopropyl alcohol solution of chloroplatinic acid. After agitation and defoaming, the composition was cured for 30 minutes at 150° C. As in Example 1, a compression factor and rubber hardness were determined. The results are shown in Table 1.

Example 4

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0003 mol/g) and having a viscosity of 5,000 centistokes at 25° C. and an average degree of polymerization of about 450, 5 parts of fumed silica having a specific surface area of 200 m$^2$/g (Aerosil 200 by Nippon Aerosil K.K.), and 8 parts (corresponding to 36% by volume of the entire composition) of microballoons (a hollow filler) made of an acrylonitrile-methacrylonitrile-vinylidene chloride copolymer, surface treated with calcium carbonate, and having a true specific gravity of 0.13, a mean particle size of 100 μm and an elasticity of 35% as measured by the above-defined method (Microsphere MFL-100CA by Matsumoto Oil, Fats & Pharmaceuticals K.K.). The mixer was operated for 30 minutes for admixing the ingredients. Further, 4.7 parts of methylhydrogenpolysiloxane of the formula (3) and 0.05 part of ethynyl cyclohexanol as a reaction controlling agent were added to the mixer where agitation was continued for a further 15 minutes, obtaining a silicone rubber composition (4).

To 113 parts of this composition was added 0.1 part of a 1% isopropyl alcohol solution of chloroplatinic acid. After agitation and defoaming, the composition was cured for 30 minutes at 150° C. As in Example 1, a compression factor and rubber hardness were determined. The results are shown in Table 1.

Comparative Example 1

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0003 mol/g) and having a viscosity of 5,000 centistokes at 25° C. and an average degree of polymerization of about 450, 5 parts of fumed silica having a specific surface area of 200 m$^2$/g (Aerosil 200 by Nippon Aerosil K.K.), and 100 parts (corresponding to 46% by volume of the entire composition) of glass balloons (a hollow filler) having a true specific gravity of 1.1, a mean particle size of 10 μm and an elasticity of 1% as measured by the above-defined method (HSC110 by Toshiba Balotini). The mixer was operated for 30 minutes for admixing the ingredients. Further, 4.7 parts of methylhydrogenpolysiloxane of the formula (3) and 0.05 part of ethynyl cyclohexanol as a reaction controlling agent were added to the mixer where agitation was continued for a further 15 minutes, obtaining a silicone rubber composition (5).

To 205 parts of this composition was added 0.1 part of a 1% isopropyl alcohol solution of chloroplatinic acid. After agitation and defoaming, the composition was cured for 30 minutes at 150° C. As in Example 1, a compression factor and rubber hardness were determined. The results are shown in Table 1.

Comparative Example 2

A planetary mixer was charged with 80 parts of the silicone rubber base (1) obtained in Example 3, 20 parts of a dimethylpolysiloxane containing vinyl radicals on side chains (vinyl value 0.0003 mol/g) and having a viscosity of 5,000 centistokes at 25° C. and an average degree of polymerization of about 450, 3 parts of hydrophobicized fumed silica having a specific surface area of 110 m$^2$/g (R-972 by Nippon Aerosil K.K.), and 70 parts (corresponding to 52% by volume of the entire composition) of ceramic balloons (a hollow filler) and having a true specific gravity of 0.70, a mean particle size of 45 μm and an elasticity of 0.5% as measured by the above-defined method (Microcells SL75 by Chichibu Onoda K.K.). The mixer was operated for 30 minutes for admixing the ingredients. Further, 4.7 parts of methylhydrogenpolysiloxane of the formula (3) and 0.05 part of ethynyl cyclohexanol as a reaction controlling agent were added to the mixer where agitation was continued for a further 15 minutes, obtaining a silicone rubber composition (6).

To 173 parts of this composition was added 0.1 part of a 1% isopropyl alcohol solution of chloroplatinic acid. After agitation and defoaming, the composition was cured for 30 minutes at 150° C. As in Example 1, a compression factor and rubber hardness were determined. The results are shown in Table 1.

TABLE 1

|  | E1 | E2 | E3 | E4 | CE1 | CE2 |
|---|---|---|---|---|---|---|
| Compression factor (%) | 18 | 13 | 15 | 15 | 6 | 4 |
| Rubber hardness (JIS K6301 A scale) | 32 | 30 | 43 | 38 | 51 | 54 |

Example 5

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0007 mol/g) and having a viscosity of 5,000 centistokes at 25° C. and an average degree of polymerization of about 700, 8 parts of hydrophobicized fumed silica having a specific surface area of 110 m$^2$/g (R-972 by Nippon Aerosil K.K.), and 4 parts of microballoons (a hollow filler) made of an acrylonitrile-methacrylonitrile-vinylidene chloride copolymer and having a true specific gravity of 0.04 and a mean particle size of 40 μm (Expancel 551DE by Expancel). The mixer was operated for 30 minutes for admixing the ingredients. Further, 5.7 parts of methylhydrogenpolysiloxane of the above formula (3), 0.05 part of ethynyl cyclohexanol as a reaction controlling agent and 1 part of polyethylene glycol were added to the mixer where agitation was continued for a further 15 minutes, obtaining a silicone rubber composition (7). This composition had a thixotropy of 0.62 inch as measured by the Boeing flow jig test.

To 118 parts of this composition was added 0.1 part of a 1% isopropyl alcohol solution of chloroplatinic acid. After agitation and defoaming, the composition was injection molded into a sheet of 2 mm thick under conditions: feed metering pressure 40 kgf/cm$^2$, injection pressure 15 kgf/cm$^2$, 150° C., and 60 seconds. The specific gravity of this sheet was measured to be 0.64.

Separately, the same composition was oven cured for 15 minutes at 150° C., obtaining a sheet of 2 mm thick. The specific gravity of this sheet was measured to be 0.56. The difference in specific gravity between the injection molded sample and the oven cured sample was as small as 0.08, which indicated that only few of the microballoons were crushed by injection molding. The cured silicone rubber was light weight and exhibited good elasticity against compression.

The oven-cured sheet of 2 mm thick was also measured for rubber hardness (JIS A scale hardness) according to JIS K-6301 as in Example 1. The result is shown in Table 2.

Example 6

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0007 mol/g) and having a viscosity of 5,000 centistokes at 25° C. and an average degree of polymerization of about 700, 5 parts of fumed silica having a specific surface area of 200 m$^2$/g (Aerosil 200 by Nippon Aerosil K.K.), and 3 parts of microballoons (a hollow filler) made of an acrylonitrile-methacrylonitrile-vinylidene chloride copolymer and having a true specific gravity of 0.06 and a mean particle size of 30 μm (Expancel 461DE by Expancel). The mixer was operated for 30 minutes for admixing the ingredients. Further, 5.7 parts of methylhydrogenpolysiloxane of the formula (3), 0.05 part of ethynyl cyclohexanol as a reaction controlling agent and 1 part of polyethylene glycol were added to the mixer where agitation was continued for a further 15 minutes, obtaining a silicone rubber composition (8). This composition had a thixotropy of 0.65 inch as measured by the Boeing flow jig test.

To 114 parts of this composition was added 0.1 part of a 1% isopropyl alcohol solution of chloroplatinic acid. After agitation and defoaming, the composition was injection molded into a sheet of 2 mm thick under the same conditions as in Example 5. The specific gravity of this sheet was measured to be 0.79.

Separately, the same composition was oven cured for 15 minutes at 150° C., obtaining a sheet of 2 mm thick. The specific gravity of this sheet was measured to be 0.72. The difference in specific gravity between the injection molded sample and the oven cured sample was as small as 0.07, which indicated that only few of the microballoons were crushed by injection molding. The cured silicone rubber was light weight and exhibited good elasticity against compression.

The oven-cured sheet of 2 mm thick was also measured for rubber hardness (JIS A scale hardness) according to JIS K-6301 as in Example 1. The result is shown in Table 2.

Comparative Example 3

A planetary mixer was charged with 80 parts of a dimethylpolysiloxane blocked with a vinyldimethylsiloxy radical at each end of its molecular chain and having a viscosity of 5,000 centistokes at 25° C. and an average degree of polymerization of about 450, 20 parts of a dimethylpolysiloxane containing vinyl radicals on side chains (vinyl value 0.0007 mol/g) and having a viscosity of 5,000 centistokes at 25° C. and an average degree of polymerization of about 700, and 3 parts of microballoons (a hollow filler) made of an acrylonitrile-methacrylonitrile-vinylidene chloride copolymer and having a true specific gravity of 0.03 and a mean particle size of 70 μm (Expancel 091DE-80 by Expancel). The mixer was operated for 30 minutes for admixing the ingredients. Further, 5.7 parts of methylhydrogenpolysiloxane of the formula (3), 0.05 part of ethynyl cyclohexanol as a reaction controlling agent and 1 part of polyethylene glycol were added to the mixer where agitation was continued for a further 15 minutes, obtaining a silicone rubber composition (9). This composition had a thixotropy of 0.63 inch as measured by the Boeing flow jig test.

To 110 parts of this composition was added 0.1 part of a 1% isopropyl alcohol solution of chloroplatinic acid. After agitation and defoaming, the composition was injection molded into a sheet of 2 mm thick under the same conditions as in Example 5. The specific gravity of this sheet was measured to be 0.88.

Separately, the same composition was oven cured for 15 minutes at 150° C., obtaining a sheet of 2 mm thick. The specific gravity of this sheet was measured to be 0.59. The difference in specific gravity between the injection molded sample and the oven cured sample was as large as 0.29, which indicated that many microballoons were crushed by injection molding.

The oven-cured sheet of 2 mm thick was also measured for rubber hardness (JIS A scale hardness) according to JIS K-6301 as in Example 1. The result is shown in Table 2.

Comparative Example 4

A kneader/mixer was charged with 60 parts of a dimethylpolysiloxane blocked with a vinyldimethylsiloxy radical at each end of its molecular chain and having a viscosity of 5,000 centistokes at 25° C. and an average degree of polymerization of about 450, 30 parts of precipitated silica (Nipsil LP by Nippon Silica Industry K.K.), 2 parts of hexamethyldisilazane and 1 part of water. After agitation was continued for one hour at room temperature, the mixer was heated until the internal temperature reached 150° C., and agitation was continued for a further 3 hours. Cooling yielded a silicone rubber base.

A planetary mixer was charged with 8 parts of this silicone rubber base, 20 parts of a dimethylpolysiloxane containing vinyl radicals on side chains (vinyl value 0.0003 mol/g) and having a viscosity of 5,000 centistokes at 25° C. and an average degree of polymerization of about 450, 3 parts of hydrophobicized fumed silica having a specific surface area of 110 m²/g (R-972 by Nippon Aerosil K.K.), and 2 parts of microballoons (a hollow filler) made of an acrylonitrile-methacrylonitrile-vinylidene chloride copolymer and having a true specific gravity of 0.02 and a mean particle size of 90 μm (Microsphere F-80ED by Matsumoto Oil, Fats & Pharmaceuticals K.K.). The mixer was operated for 30 minutes for admixing the ingredients. Further, 4.7 parts of methylhydrogenpolysiloxane of the formula (3), 0.05 part of ethynyl cyclohexanol as a reaction controlling agent and 1 part of polyethylene glycol were added to the mixer where agitation was continued for a further 15 minutes, obtaining a silicone rubber composition (10). This composition had a thixotropy of 0.59 inch as measured by the Boeing flow jig test.

To 110 parts of this composition was added 0.1 part of a 1% isopropyl alcohol solution of chloroplatinic acid. After agitation and defoaming, the composition was injection molded into a sheet of 2 mm thick under the same conditions as in Example 5. The specific gravity of this sheet was measured to be 0.85.

Separately, the same composition was oven cured for 15 minutes at 150° C., obtaining a sheet of 2 mm thick. The specific gravity of this sheet was measured to be 0.57. The difference in specific gravity between the injection molded sample and the oven cured sample was as large as 0.28, which indicated that many microballoons were crushed by injection molding.

The oven-cured sheet of 2 mm thick was also measured for rubber hardness (JIS A scale hardness) according to JIS K-6301 as in Example 1. The result is shown in Table 2.

TABLE 2

|  | E5 | E6 | CE3 | CE4 |
|---|---|---|---|---|
| Rubber hardness (JIS K6301 A scale) | 36 | 34 | 28 | 41 |

Japanese Patent Application Nos. 10-293220 and 10-294352 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A hollow filler-containing silicone rubber composition comprising
   (1) 100 parts by weight of an organopolysiloxane having on the average at least two alkenyl radicals in a molecule and an average degree of polymerization of up to 1,200,
   (2) 0.1 to 50 parts by weight of an organohydrogenpolysiloxane of the following average compositional formula (2):

$R_b H_c SiO_{(4-b-c)/2}$ wherein R is a substituted or unsubstituted monovalent hydrocarbon radical of 1 to 10 carbon atoms,
   (3) a catalytic amount of an addition reaction catalyst, and
   (4) 0.5 to 10 parts by weight of a hollow filler in the form of microballoons having a mean particle size of 30 to 60 μm and an elasticity of at least 10%.

2. The composition of claim 1 wherein said hollow filler is formed of a thermoplastic resin.

3. The composition of claim 1 further comprising 0.01 to 30 parts by weight of a thixotropic agent per 100 parts by weight of the organopolysiloxane.

4. The composition of claim 1 having a thixotropy corresponding to a sag of up to 1 inch after 1 minute as measured by the Boeing flow jig test.

5. The composition of claim 1 which is to be molded and cured by an injection molding process.

6. The composition of claim 1, wherein said microballoons have a mean particle size of 30 to 50 μm.

7. The composition of claim 1, wherein said microballoons have a mean particle size of 30 to 40 μm.

8. The composition of claim 1, wherein organopolysiloxane has the following average compositional formula (1):

$R^1_a SiO_{(4-a)/2}$ wherein $R^1$ is a substituted or unsubstituted monovalent hydrocarbon radical having 1 to 10 carbon atoms and a is a positive number of 1.5 to 2.8.

9. The composition of claim 1, wherein said addition reaction catalyst is a member selected from the group consisting of platinum catalysts, palladium catalysts, and rhodium catalysts.

10. The composition of claim 2, wherein said thermoplastic resin is a member selected from the group consisting of homopolymers of vinylidene chloride, acrylonitrile, methacrylonitrile, an acrylate, a methacrylate, and copolymers of two or more of these monomers.

11. The composition of claim 3, wherein said thixotropic agent is a member selected from the group consisting of fumed silica, fumed titanium dioxide, carbon, polyether compounds, polyether-siloxane block copolymers, dimethylsiloxane/diphenylsiloxane copolymers, and mixtures thereof.

* * * * *